United States Patent [19]

Cappelli

[11] Patent Number: 4,717,898

[45] Date of Patent: Jan. 5, 1988

[54] POWER COMBINER, POLARIZER AND STRUCTURE INCLUDING A WAVEGUIDE SECTION ROTATED BY A STEPPER MOTOR ARRANGEMENT

[75] Inventor: Guido Cappelli, Dollard-des-Ormeaux, Canada

[73] Assignee: MITEC Electronics Ltd., Montreal, Canada

[21] Appl. No.: 879,045

[22] Filed: Jun. 26, 1986

[51] Int. Cl.$^4$ .............................................. H01P 1/165
[52] U.S. Cl. .................................. 333/137; 310/49 R; 333/21 A; 333/256
[58] Field of Search ............... 333/125, 126, 135, 137, 333/21 A, 256, 257; 343/757, 766; 310/261, 266

[56] References Cited

U.S. PATENT DOCUMENTS

| | | | |
|---|---|---|---|
| 2,782,384 | 2/1957 | Zaleski | 333/257 |
| 3,215,957 | 11/1965 | Dantzig et al. | 333/21 R |
| 3,569,870 | 3/1971 | Foldes | 333/21 R |
| 3,656,070 | 4/1972 | Monaghan et al. | 333/21 A |
| 4,048,531 | 9/1977 | Buess et al. | 310/80 X |
| 4,228,410 | 10/1980 | Goudey et al. | 333/122 |
| 4,491,810 | 1/1985 | Saad | 333/126 |
| 4,492,938 | 1/1985 | Young | 333/111 |
| 4,498,062 | 2/1985 | Massaglia et al. | 333/135 |
| 4,504,805 | 3/1985 | Ekelman, Jr. et al. | 333/126 |
| 4,633,201 | 12/1986 | Ruff | 333/106 |

Primary Examiner—Paul Gensler
Attorney, Agent, or Firm—Robic, Robic & Associates

[57] ABSTRACT

In a waveguide structure, there is provided a waveguide section rotatable about its longitudinal axis and an electric DC stepper motor arrangement. The rotor of such an arrangement is constituted by magnetic returns fixedly mounted on the waveguide section, and has a rotation axis which coincides with the longitudinal axis of the section. The rotor is therefore rotatable with the waveguide section about the longitudinal axis of the same. The motor arrangement further includes a stator provided with a plurality of poles which cooperate with the magnetic returns to rotate the waveguide section so as to adjust as desired its angular position. When the waveguide section has a circular cross section and is provided with two diametrically opposed lines of tuning screws, the waveguide structure forms a microwave polarizer which can be used in a variable power combiner.

12 Claims, 10 Drawing Figures

POWER COMBINER, POLARIZER AND STRUCTURE INCLUDING A WAVEGUIDE SECTION ROTATED BY A STEPPER MOTOR ARRANGEMENT

BACKGROUND OF THE INVENTION

1. Field of the Invention

The present invention relates to a waveguide structure including a waveguide section rotatable about its longitudinal axis by means of an electric motor arrangement. Such an arrangement includes rotor means fixedly mounted on the waveguide section so as to be rotatable with the section about the longitudinal axis of the same.

The invention also relates to a microwave polarizer using the microwave structure and to a variable power combiner using the polarizer.

2. Brief Description of the Prior Art

U.S. Pat. Nos. 3,215,957 (DANTZIG ET Al) issued on Nov. 2, 1965, and 3,569,870 (FOLDES) issued on Mar. 9, 1971, describe microwave polarizer devices including a waveguide section rotatable about its geometrical longitudinal axis. In both cases, a first gear is mounted on the waveguide section in a plane perpendicular to the longitudinal axis of the same. A second gear in meshed engagement with the first one is mounted on the shaft of an electric motor, whereby this electric motor can rotate the waveguide section through the first and second gears. Such a prior art design therefore uses two gears in meshed engagement with respect to each other to rotate the waveguide section, which results in a complex polarizer device. Moreover, in order to accurately position the waveguide section by means of the two gears, a complex feedback control of the electric motor is provided (see U.S. Pat. No. 3,215,957).

SUMMARY OF THE INVENTION

An object of the present invention is to provide a simplified design for a waveguide structure including a waveguide section rotatable about its longitudinal axis by means of an electric motor arrangement.

Another object of the present invention is to simplify control of the electric motor arrangement.

According to the present invention, there is provided a waveguide structure comprising a waveguide section rotatable about a longitudinal axis thereof, and an electric motor arrangement. The motor arrangement includes (a) rotor means fixedly mounted on the waveguide section, which rotor means having a rotation axis which coincides with the longitudinal axis of the waveguide section and being therefore rotatable with the waveguide section about this longitudinal axis, and (b) stator means associated with the rotor means. In operation, the rotor means cooperates with the stator means of the electric motor arrangement to rotate the waveguide section about its longitudinal axis.

In accordance with the present invention, there is also provided a microwave polarizer comprising a waveguide section rotatable about a longitudinal axis thereof, microwave tuning means fixed to the waveguide section and positioned inside of this section, and an electric stepper motor arrangement. The motor arrangement includes (a) rotor means fixedly mounted on the waveguide section, which rotor means having a rotation axis which coincides with the longitudinal axis of the waveguide section and being therefore rotatable with the waveguide section about this longitudinal axis, and (b) stator means associated with the rotor means. In operation, the rotor means cooperates with the stator means of the stepper motor arrangement to rotate the waveguide section about its longitudinal axis so as to angular position as desired the waveguide section and the microwave tuning means.

According to the present invention, there is further provided a variable microwave power combiner comprising microwave signal combining means for combining a first microwave input signal and a second microwave input signal into a microwave combination signal, and microwave signal separating means for separating the microwave combination signal into a first microwave output signal and a second microwave output signal. The power combiner further comprises a microwave polarizer including a waveguide section, microwave tuning means, and an electric stepper motor arrangement. The waveguide section is mounted between the microwave signal combining and separating means whereby the combination signal propagates therein from the combining means to the separating means. Moreover, the waveguide section has a longitudinal axis and a circular cross-section, and is rotatable with respect to the combining and separating means about the longitudinal axis of this section. The microwave tuning means are fixed to the waveguide section and positioned inside of this section so as to interact with the microwave combination signal. The electric stepper motor arrangement includes (a) rotor means fixedly mounted on the waveguide section, which rotor means having a rotation axis which coincides with the longitudinal axis of the waveguide section and being therefore rotatable with the waveguide section about the longitudinal axis of this section, and (b) stator means associated with the rotor means. In operation, the rotor means cooperates with the stator means of the stepper motor arrangement to rotate the waveguide section about its longitudinal axis so as to vary the angular position of the waveguide section and of the tuning means. Variation of the angular position of the waveguide section and of the tuning means causes, due to the interaction of the tuning means with the microwave combination signal, rotation of the electric field in the waveguide section to thereby vary proportions of the first and second microwave input signals in the first microwave output signal produced by the separating means as well as proportions of the first and second microwave input signals in the second microwave output signal produced by the microwave signal separating means.

BRIEF DESCRIPTION OF THE DRAWINGS

The objects, advantages and other features of the present invention will become more apparent upon reading of the following non restrictive description of a preferred embodiment thereof, made in conjunction with the accompanying drawings in which.

FIGS. (1a), (1b) and (1c) are block diagrams showing the structure and operation of a variable microwave power combiner comprising an input orthogonal transducer, a polarizer, and an output orthogonal transducer.

Figure 1A:
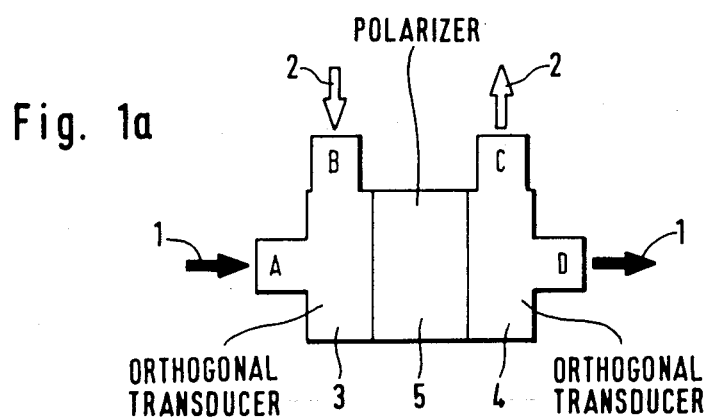
Figure 1B:
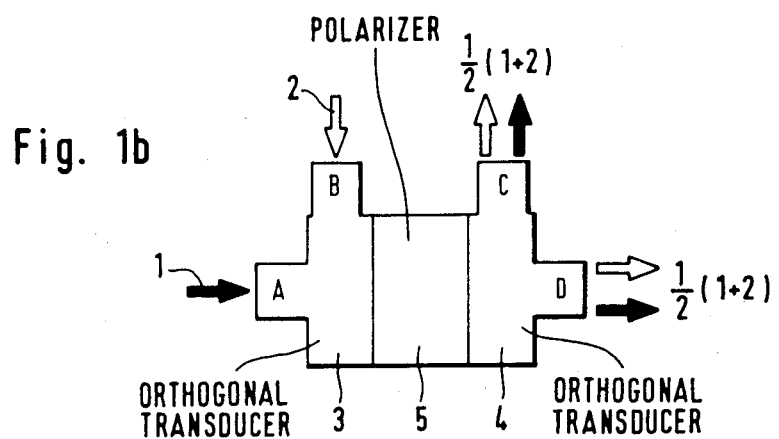
Figure 1C:
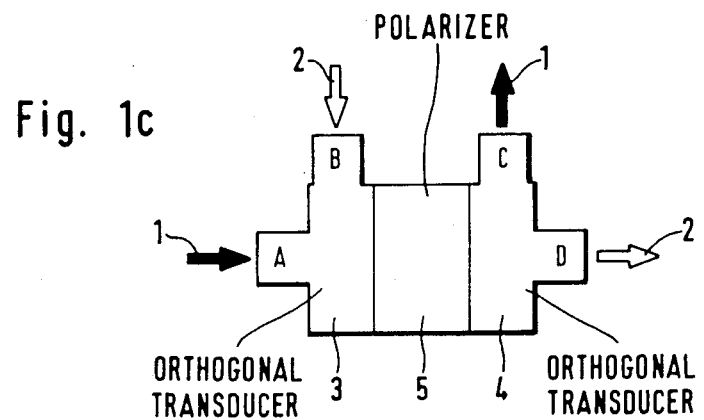
Figure 2:
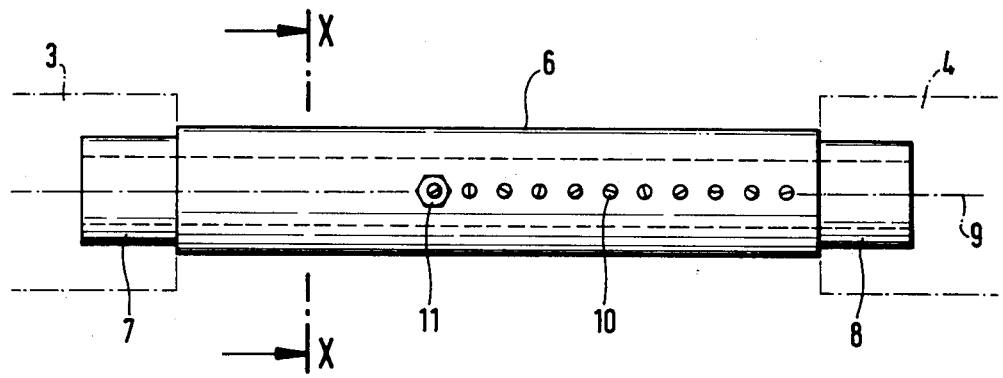
FIG. 2 is a top view of a rotatable waveguide section forming part of the polarizer of the power combiner of FIG. 1.
Figure 3A:
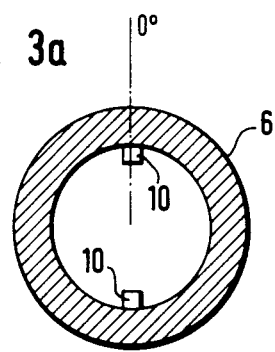
Figure 3C:
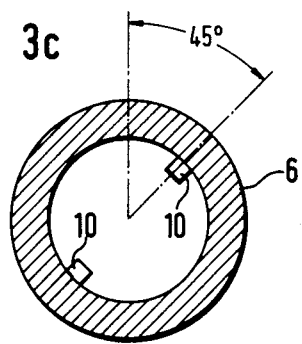
Figure 3B:
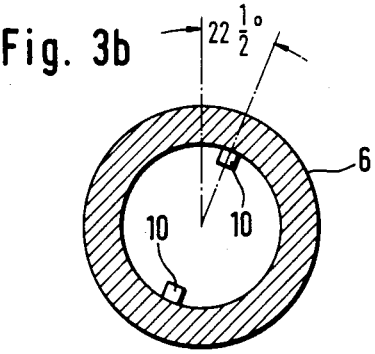
Figure 3D:
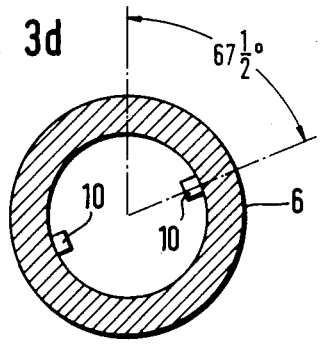
Figure 4:
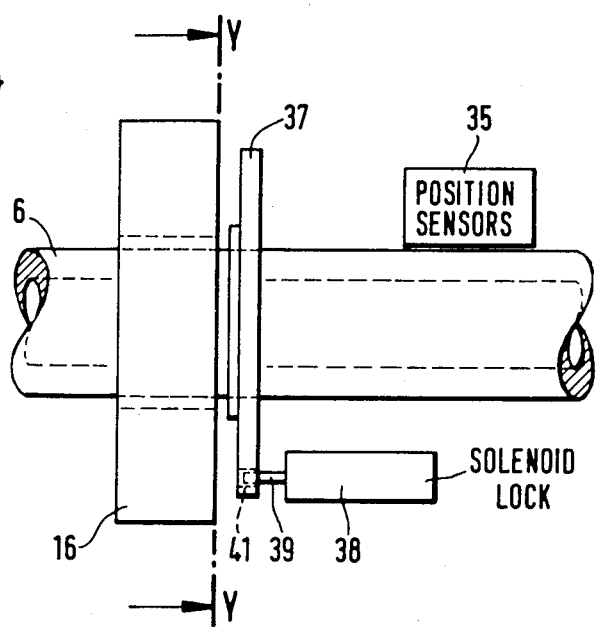
Figure 5:
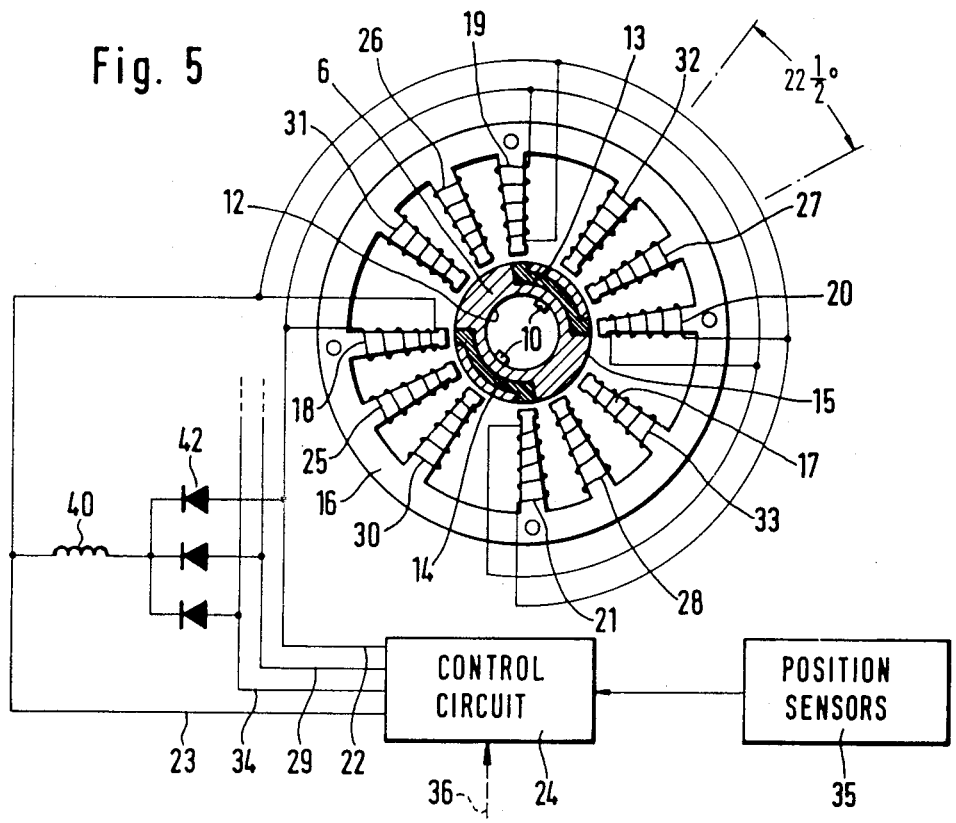

FIGS. (3a), (3b), (3c) and (3d) are cross-sectional views of the rotatable waveguide section of FIG. 2 taken along the axis X—X and showing different angular positions of this waveguide section; and FIGS. 4 and 5 illustrate an electric DC stepper motor arrangement forming part of the polarizer of the power combiner of FIG. 1 and provided for rotating the waveguide section of FIG. 2 in order to appropriately angularly position the same.

DETAILED DESCRIPTION OF THE PREFERRED EMBODIMENT

As shown on FIGS. (1a), (1b) and (1c), the variable microwave power combiner comprises an input orthogonal transducer 3 and an output orthogonal transducer 4 interconnected together through a microwave polarizer 5. The input orthogonal transducer 3 is stationary with respect to the output orthogonal transducer 4.

The polarizer 5 comprises as illustrated in FIG. 2 a waveguide section 6 having a circular cross section, which section 6 is rotatably mounted between the input and output orthogonal transducers 3 and 4 through end portions 7 and 8 of reduced diameter. The waveguide section 6, which is therefore rotatable about its longitudinal axis 9, is also provided with two lines of tuning screws such as 10. As it is apparent from FIGS. (3a) to (3d), the two lines of tuning screws 10 are diametrically opposed with respect to each other. As it is well known in the art, each tuning screw 10 includes a post section extending inside of the waveguide section 6 and a screw portion which is screwed in a threaded hole made through the wall of the waveguide section 6. The screw portion cooperates with the threaded hole to fix the tuning screw on the section 6 and to provide for adjustment of the length of the post portion inside of the waveguide section 6. A threaded nut such as 11 also engages the screw portion of each tuning screw 10 on the outside of the section 6 in order to lock the tuning screw in position.

Referring back to FIGS. (1a) to (1c) of the drawings, the input orthogonal transducer 3 is provided with a first input port A receiving a first orthogonally polarized microwave signal 1 from a waveguide (not shown) having a rectangular cross section, and a second input port B receiving a second orthogonally polarized microwave signal 2 from another rectangular waveguide (not shown). The input orthogonal transducer 3 combines the two input signals 1 and 2 into a microwave combination signal which may propagate through the waveguide section 6 of FIG. 2 from the input transducer 3 to the output transducer 4. The latter then separates the microwave combination signal into two output microwave signals delivered through two output ports C and D of the transducer 4, respectively.

The two output microwave signals from the ports C and D are orthogonally polarized microwave signals which may propagate in waveguides having a rectangular cross section. The output orthogonal transducer 4 thus carries out a function which is the inverse of that carried out by the input orthogonal transducer 3.

Such input and output orthogonal transducers are well known in the art, and for that reason they will not be further elaborated.

In the waveguide section 6, the two diametrically opposed lines of tuning screws 10 interact with the microwave combination signal, and, depending on the angular orientation of these two lines of tuning screws, the electric field in the section 6 will rotate of a given amount. The combination signal will thus exit the waveguide section 6 with an orientation different from that at the input of the section 6.

The input and output orthogonal transducers 3 and 4 are so oriented that, when the two lines of tuning screws 10 are oriented as shown on FIG. (3a), the input signal 1 received at the input port A is delivered through the output port D while the input signal 2 received at the input port B is delivered through the output port C, as shown on FIG. (1a).

When the waveguide section 6 is rotated about its longitudinal axis 9 so that the orientation of the two lines of tuning screws 10 (see FIG. (3b)) becomes 22½° apart from their orientation in FIG. (3a), the output microwave signals delivered through the output ports C and D of the output orthogonal transducer 4 are both formed by half of the input signal 1 added to half of the input signal 2 (see FIG. 1b)).

When the waveguide section 6 is rotated about its longitudinal axis 9 so that the orientation of the two lines of tuning screws 10 (see FIG. (3c)) becomes 45° apart from their orientation in FIG. (3a), the input microwave signal 1 received at the input port A is delivered as shown in FIG. (1c) through output port C while the microwave input signal 2 received at the input port B is delivered through the output port D.

When the waveguide section 6 is rotated about its longitudinal axis 9 so that the orientation of the two lines of tuning screws 10 (see FIG. (3d)) becomes 67½° apart from their orientation in FIG. (3a), the variable power combiner acts as a load to which the input microwave signals 1 and 2 are applied. This is useful when no transmission of the input microwave signals 1 and 2 to the output ports C and D of the output orthogonal transducer 4 is required.

It is apparent that the function of a variable power combiner of the type described hereinabove is to direct and/or to combine microwave signals as required, for example, in a microwave communication system.

FIGS. 4 and 5 of the attached drawings illustrate the electric DC stepper motor arrangement used to rotate the waveguide section 6 so as to angularly orient as desired the two lines of tuning screws 10, in order to obtain appropriate directing and/or combining of the two input signals 1 and 2 through the variable power combiner. FIG. 5 is a cross-sectional view taken along the axis Y—Y of FIG. 4.

As shown in FIGS. 4 and 5, the waveguide section 6 comprises an inner electrically conducting surface 12. It is well known that such waveguide sections are usually made of an electrically conducting material, such as aluminium.

In the wall of the waveguide section 6 are provided two ferrous magnetic returns 13 and 14. These two magnetic returns 13 and 14 are embedded in the wall of the waveguide section 6 outside of the inner surface 12, whereby no obstruction to the propagation of microwave signals within the section 6 is caused. The two magnetic returns 13 and 14 comprise ends emerging from the outer surface 15 of the waveguide section 6. Consequently, the rotor of the stepper motor arrangement is constituted by the waveguide section 6 itself in which the magnetic returns 13 and 14 are provided.

The portion of the waveguide section 6 containing the magnetic returns 13 and 14 is surrounded by a stator forming part of the stepper motor arrangement and comprising a magnetic core 16 defining four sets of three poles such as 17. As can be seen on FIG. 5, each set of three poles is associated with a corresponding end of the magnetic returns 13 and 14.

Each stator pole 17 is provided with a winding such as 18 wrapped thereon. The windings of each set of three poles associated with a same angular orientation or position of the waveguide section 6 are connected in parallel to each other (see for example windings 18 to 21 on FIG. 5), whereby simultaneous energization of these four windings 18 to 21 can be carried out through outputs 22 and 23 of a control circuit 24, which supplies DC power to the windings.

Accordingly, the windings 25 to 28 are connected in parallel between an output 29 and the ground output 23 of the control circuit 24, while the four windings 30 to 33 are also connected in parallel between an output 34 and the ground output 23 of the control circuit 24, whereby these two sets of four windings can be energized as desired through the outputs 29, 34 and 23 of the control circuit 24. The parallel connection of each of the above defined sets of four windings is shown only in relation with the windings 18 to 21 for the purpose of simplification of the drawings.

Energization of one of the above defined sets of four parallel windings produces a magnetic flux.

The magnetic returns then tend to move so as to reduce the reluctance of the magnetic circuit, thereby creating a torque which rotates the waveguide section 6.

The control circuit 24 which may take a plurality of different designs is associated with sensors of the angular position of the waveguide section 6 identified by the reference 35. The sensors 35 monitor the angular position of the waveguide section 6 in order to allow the circuit 24 to control energization of the sets of four parallel windings so as to cause rotation, in either one of the two directions of rotation about the longitudinal axis 9, of the section 6 towards the desired angular position of the latter. In some applications, it may be convenient that the circuit 24 controls this angular position in response to external command signals received on an input 36, instead of controlling it by itself.

As illustrated in FIG. 4, the polarizer is further provided with a locking thumbwheel 37 fixedly mounted on the waveguide section 6 and lying in a plane perpendicular to the longitudinal axis of the section 6. A solenoid lock 38 is associated with the thumbwheel 37. This solenoid lock 38 is provided with a pin 39 which can be removed from slots of the thumbwheel 37 through energization of a coil 40 (FIG. 5) of the lock 38 thereby allowing rotation of the waveguide section 6. The thumbwheel 37 is provided with four slots such as 41 so as to allow the pin 39 to lock the waveguide section 6 at the four positions of FIGS. (3a) to (3d).

As can be seen in FIG. 5, the coil 40 of the solenoid lock 38 is connected between on the one hand the outputs 22, 29 and 34 of the circuit 24, and on the other hand the ground output 23 through diodes 42. Consequently, upon energizing of any of the three sets of four parallel windings, the coil 40 is also energized to produce a magnetic field which moves the pin 39 to release the thumbwheel 37, whereby the waveguide section 6 becomes free to rotate.

Upon de-energization of the windings, residual magnetism causes the waveguide section 6 to maintain its position. At that time the coil 40 of the solenoid lock 38 is also de-energized. The pin 39 is thus released to lock the thumbwheel 37 due to its insertion in a corresponding slot 41, thereby locking the waveguide section 6.

One can appreciate that the windings and poles of the stator of the stepper motor arrangement of FIGS. 4 and 5 can position the waveguide section 6 at the three different angular positions corresponding to those of FIGS. (3a) to (3c), as adjacent poles of a same pole set are 22½° apart.

The last angular position which corresponds to that of FIG. (3d) of the attached drawings can be obtained manually, when desired. For that purpose, the pin 39 may be released manually or through energization of the coil 40 through a manual switch provided to that effect so as to allow manual rotation of the waveguide section 6. At the latter position of the waveguide section, the variable power combiner constitutes a load, as stated above.

In order to increase the torque produced by the stepper motor arrangement, the number of poles may be increased, and the pole ends may be fringed.

Moreover, when the operation of the variable power combiner requires adjustment of the angular position of the waveguide section 6 at more than three positions by means of the stepper motor arrangement, each of the four above defined sets of poles may be provided with an appropriate number of poles (greater than three) so as to allow positionment of the waveguide section 6 at all the required positions. The number and positions of slots 41 of the thumbwheel 37 are then modified accordingly.

The advantages of the use of a DC electrical stepper motor arrangement associated with a locking thumbwheel and a solenoid lock as described hereinabove may be summarized as follows:
(a) simplicity of construction;
(b) smoothness of operation;
(c) repeatability;
(d) speed of operation;
(e) compactness;
(f) ease of construction and of assembly;
(g) ease of calibration;
(h) redesignable for other step configurations;
(i) insensitivity to the location of the position sensors which may be constituted by sensor switches;
(j) durability;
(k) high starting/stopping torque; and
(l) scaleable to larger/smaller waveguide sizes.

Although the present invention has been described in details hereinabove by means of a preferred embodiment thereof, it should be noted that modifications to this preferred embodiment, within the scope of the appended claims, is not deemed to change or alter the nature and scope of the present invention.

What is claimed is:

1. A microwave polarizer comprising:
a waveguide section rotatable about a longitudinal axis thereof and including an inner, waveguide surface;
microwave tuning means fixed to the waveguide section and positioned inside of said inner, waveguide surface;
an electric stepper motor arrangement including (a) rotor means fixedly mounted on the waveguide section but positioned outside of said inner, waveguide surface, which rotor means having a rotation axis which coincides with said longitudinal axis and being therefore rotatable with the waveguide section about said longitudinal axis, (b) stator means associated with the rotor means and also positioned outside of said inner, waveguide surface, and (c)

windings mounted on at least one of said rotor and stator means, which windings can be energized to cause rotation of the rotor means about said longitudinal axis, and consequently rotation of the waveguide section and microwave tuning means about said longitudinal axis;

control means for energizing said windings of the stepper motor arrangement so as to rotate the waveguide section about its longitudinal axis in either one of the two directions of rotation in order to move said microwave tuning means from any one of a plurality of angular positions to any other one of said angular positions; and means for locking said waveguide section with said microwave tuning means in said other angular position.

2. The microwave polarizer of claim 1, wherein said waveguide section has a circular cross section, and wherein said tuning means comprises two diametrically opposed lines of tuning screws both parallel to the longitudinal axis of the rotatable waveguide section.

3. The microwave polarizer of claim 1, wherein the rotor means of the stepper motor arrangement includes a plurality of magnetic returns, and wherein the stator means includes a plurality of poles.

4. The microwave polarizer of claim 3, in which the waveguide section has a circular cross section, and in which the magnetic returns are embedded in the wall of the waveguide section outside of said inner, waveguide surface.

5. The microwave polarizer of claim 3, wherein each magnetic return comprises two ends, and wherein each magnetic return end is associated with a corresponding set of poles of the stator means, each pole set having a number of poles which corresponds to the number of said angular positions.

6. The microwave polarizer of claim 5, wherein the windings of said motor arrangement include a winding wrapped around each pole of the stator means, and wherein said control means comprises means for energizing said windings in accordance with signals from sensors of the angular position of the waveguide section.

7. The microwave polarizer of claim 6, in which said windings are arranged in a plurality of sets of windings, the windings of each winding set being connected to be energized simultaneously by the control means, and each winding set being associated with one of said angular positions.

8. A microwave polarizer comprising:
a waveguide section rotatable about a longitudinal axis thereof;
microwave tuning means fixed to the waveguide section and positioned inside of said section;
an electric stepper motor arrangement including: (a) rotor means fixedly mounted on the waveguide section, which rotor means having a rotation axis which coincides with said longitudinal axis and being therefore rotatable with the waveguide section about said longitudinal axis; and (b) stator means associated with the rotor means; said rotor means cooperating with the stator means to rotate the waveguide section about its longitudinal axis so as to angularly position as desired the waveguide section and said microwave tuning means;
said rotor means comprising a plurality of magnetic returns, and said stator means comprising a plurality of sets of poles, each pole set having a number of poles which corresponds to a number of angular positions at which the rotatable waveguide section has to be positioned, each magnetic return comprising two ends, and each magnetic return end being associated with a corresponding one of the sets of poles of the stator means;
said stator means including a winding wrapped around each pole of the stator means, and said motor arrangement including a control circuit for energizing said windings in accordance with signals from sensors of the angular position of the waveguide section, said windings being arranged in a plurality of sets of windings, the windings of each winding set being connected to be energized simultaneously by the control circuit, and each winding set being associated with one of said angular positions at which the rotatable waveguide section has to be positioned;
a locking thumbwheel fixedly mounted on the waveguide section and lying in a plane perpendicular to the longitudinal axis of the waveguide section; and
a solenoid lock to lock the thumbwheel when the waveguide section has been posioned at the desired angular position, said solenoid lock comprising a coil energized each time one of the sets of windings is energized in order to release the locking thumbwheel and to allow rotation of the waveguide section about its longitudinal axis.

9. A microwave polarizer comprising:
a waveguide section rotatable about a longitudinal axis thereof;
microwave tuning means fixed to the waveguide section and positioned inside of said section;
an electric stepper motor arrangement including: (a) rotor means fixedly mounted on the waveguide section, which rotor means having a rotation axis which coincides with said longitudinal axis and being therefore rotatable with the waveguide section about said longitudinal axis; and (b) stator means associated with the rotor means; said rotor means cooperating with the stator means to rotate the waveguide section about its longitudinal axis so as to angularly position as desired the waveguide section and said microwave tuning means; and
means for locking the waveguide section when the same has been positisoned at the desired angular position, said locking means comprising a locking thumbwheel provided with slots therein and fixedly mounted on the waveguide section in a plane perpendiculars to said longitudinal axis, and a solenoid lock provided with pin means which cooperates with the slots of the thumbwheel to lock the rotatable waveguide section.

10. A variable microwave power combiner comprising:
microwave signal combining means for combining a first microwave input signal and a second microwave input signal into a microwave combination signal;
microwave signal separating means for separating the microwave combination signal into a first microwave output signal and a second microwave output signal; and
a microwave polarizer including:
(a) a waveguide section mounted between the microwave signal combining and separating means and in which said combination signal propagates from the combining means to the separating means, which waveguide section has a longitudinal axis, a circular cross section and an inner, cylindrical waveguide surface, and is rotatable with respect to the combining and separating means about said longitudinal axis;

(b) microwave tuning means fixed to the waveguide section and positioned inside of said inner, waveguide surface so as to interact with the microwave combination signal;

(c) an electric stepper motor arrangement including: (i) rotor means fixedly mounted on the waveguide section but positioned outside of said inner, waveguide surface, said rotor means having a rotation axis which coincides with said longitudinal axis and being therefore rotatable with the waveguide section about said longitudinal axis, (ii) stator means associated with the rotor means and also positioned outside of said inner, waveguide surface, and (iii) windings mounted on at least one of said rotor and stator means, which windings can be energized to cause rotation of the rotor means about said longitudinal axis, and consequently rotation of the waveguide section and microwave tuning means about said longitudinal axis;

(d) control means for energizing said windings of the stepper motor arrangement so as to rotate the waveguide section about its longitudinal axis in either one of the two directions of rotation in order to move said microwave tuning means from any one of a plurality of angular positions to any other one of said angular positions; and (e) means for locking said waveguide section with said microwave tuning means in said other angular position;

whereby, in operation, moving of the microwave tuning means from one of said plurality of angulasr positions to another one of said angular positions causes, due to the interaction of the tuning means with the microwave combination signal, rotation of the electric field in the waveguide section to thereby vary proportions of the first and second microwave input signals in the first microwave output signal produced by the separating means as well as proportions of the first and second microwave input signals in the second microwave output signal produced by the microwave signal separating means.

11. A variable microwave power combiner according to claim 10, wherein said tuning means comprises two diametrically opposed lines of tuning screws both parallel to the longitudinal axis of the waveguide section.

12. A variable microwave power combiner according to claim 10, wherein said microwave signal combining means and said microwave signal separating means each comprises an orthogonal transducer.

* * * * *